July 5, 1938.　　　A. H. HENNINGER　　　2,122,861
MANUFACTURE OF CALCIUM ARSENATE
Filed May 24, 1935
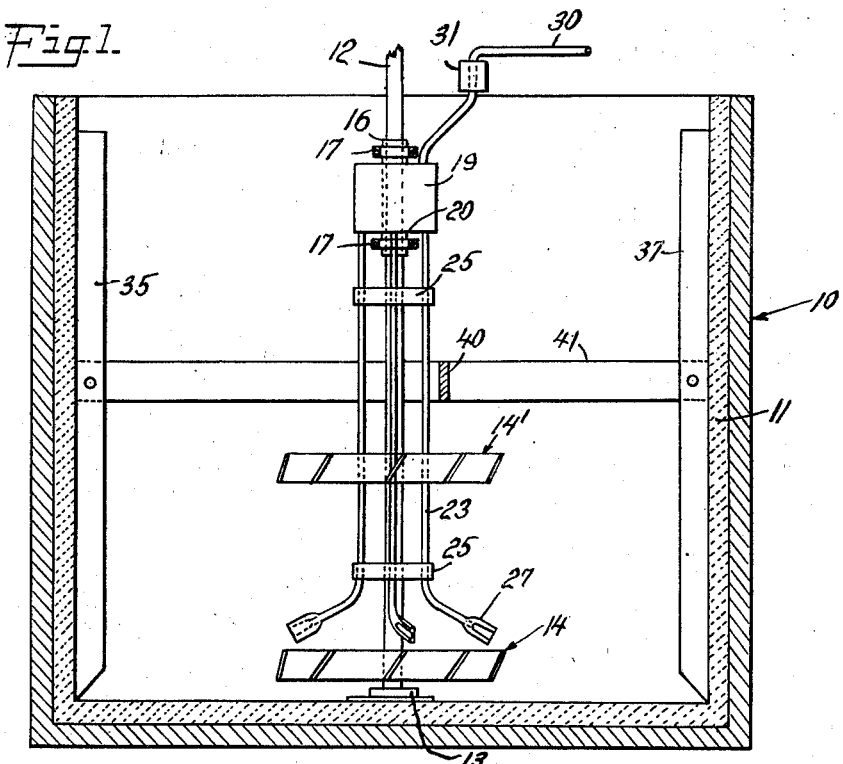
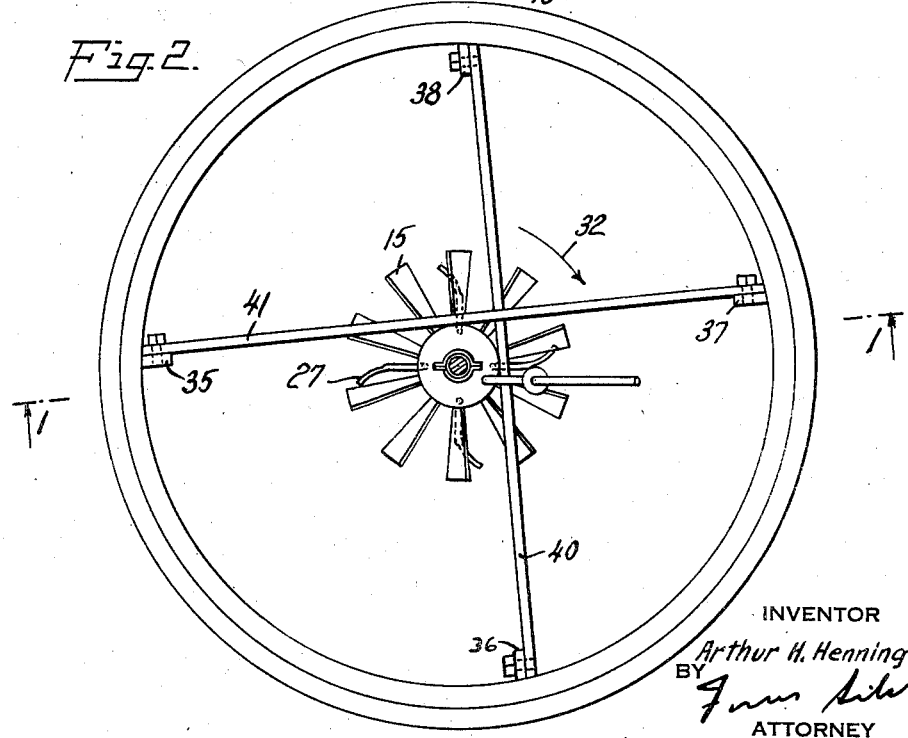
INVENTOR
Arthur H. Henninger
BY
ATTORNEY Patented July 5, 1938

2,122,861

UNITED STATES PATENT OFFICE 2,122,861

MANUFACTURE OF CALCIUM ARSENATE

Arthur H. Henninger, Floral Park, N. Y., assignor to General Chemical Company, New York, N. Y., a corporation of New York Application May 24, 1935, Serial No. 23,246

1 Claim. (Cl. 23—53)

This invention relates to the manufacture of calcium arsenate. More particularly the invention is directed to calcium arsenates low in water soluble arsenic and especially suitable for use as insecticides without burning foliage, and to methods for making these products.

In commercial practice, calcium arsenate is usually made by forming a water slurry of calcium hydrate and adding arsenic acid in quantity sufficient to react with the calcium hydrate and form the water insoluble basic calcium arsenates. In this reaction, as usually carried out, there are also formed relatively small amounts of water soluble arsenates of calcium. It is generally acknowledged that the water soluble arsenic content of arsenical insecticides causes burning of foliage and the amount of water soluble arsenic is a measure of the burning effect of such insecticide. Calcium arsenate has been used for insecticidal purposes for years, and during this time it has been the aim of producers to make calcium arsenate containing as little water soluble arsenic as possible. The water soluble arsenic has been stated to be the acid salt, calcium tetrahydric arsenate $CaH_4(AsO_4)_2$, and it is commonly believed that this salt is formed during production of and becomes occluded in the water insoluble arsenate precipitate which constitutes the bulk of the product. Other water soluble calcium arsenates may be formed. Many different methods have been proposed for making calcium arsenate with a view to reducing the water soluble arsenic content of the product, including methods involving addition of other compounds to the reaction mixture such as an alkali hydroxide, or a halide or nitrate of alkali or alkaline earth. Such foreign or extraneous substances either dilute the final products or necessitate removal by treatment of the water insoluble calcium arsenate precipitate.

In accordance with the present invention I have discovered that a stable calcium arsenate low in water soluble arsenic content can be produced from lime and arsenic acid alone without addition of other compounds.

According to the invention, it has been found that formation of water soluble arsenic may be minimized by adding the acid to the slurry while effecting turbulent agitation of the slurry, in the zone of introduction of the acid, in such a way as to avoid any local excess of arsenic acid over that required to react with the calcium hydrate, to effect a rapid diffusion of the arsenic acid in the slurry and to provide for contact of acid with a sufficient amount of calcium hydrate to cause precipitation of the water insoluble product containing but very small amounts of the water soluble salt. By distributing the acid relatively uniformly throughout the mass, at least in the zone of addition of acid to the slurry, localized reactions of acid and calcium hydroxide of such nature as to produce the water soluble calcium arsenates are substantially avoided.

In making the products of the invention, the improved process of the invention may be carried out in apparatus one suitable embodiment of which is illustrated in vertical section and in plan in Figs. 1 and 2 of the accompanying drawing, the section of Fig. 1 being taken approximately on line 1—1 of Fig. 2.

Referring to the drawing, mixing tank 10, having a brick lining 11, is of circular horizontal cross-section, and in the present example, it may be considered the diameter and the depth of the tank are approximately equal. Agitator shaft 12, journalled at the lower end in a bearing 13 on the bottom of the tank, carries a turbine agitator 14 comprising say 10 radially disposed mixer blades 15. A second similarly made agitator 14' is fixed to shaft 12 and is spaced from the bottom of tank 10 a distance equal to about a third of the depth of the tank.

A tubular hub 16 is fastened tightly to shaft 12 by clamps 17. The cylindrical acid receiver 19 is welded at 20 to and hence carried and supported by hub 16. The top edge of the receiver is flanged inwardly to prevent escape of liquid forced by centrifugal motion against the vertical walls of the receiver. Projecting downwardly from near the outer circumference of receiver 19 are several for example four liquid delivery pipes 23. It is noted pipes 23 are spaced outwardly from the rotating shaft 12 an appreciable distance so as to effect discharge by centrifugal force of acid from the receiver and delivery pipes. The latter are held in place by brackets 25 fixed to shaft 12. As will be seen from the drawing, the outlet ends of pipes 23 terminate in flattened surfaces 27 providing plane-like areas facilitating delivery of acid to the slurry in relatively thin films. It will be understood the surfaces from which acid is delivered face in the direction of movement of pipes 23 and receiver 19 all of which rotate with shaft 12 and agitator 14. Acid is fed into receiver 19 through a stationary inlet pipe 30 supported by a bracket 31. Four vertical baffles 35, 36, 37 and 38 are fastened to the inner walls of the tank, preferably at intervals of about 90°. There are also provided two horizontal baffles 40 and 41 attached at either ends to oppositely disposed baffles.

One example of carrying out the method of the invention to produce a stable calcium arsenate low in water soluble arsenic is as follows: About 1170 gallons of water are run into tank 10, with the agitators 14 and 14' running at about 125 R. P. M. About 2475 pounds hydrated lime or freshly slaked lime are added. Approximately 75% arsenic acid, equivalent to 2275 pounds 100% acid, is run into the slurry in a continuous stream, during a period of about one hour, through line 30, receiver 19 and delivery pipes 23. When the acid has been fed into the tank, the temperature of the batch is raised, for example by injecting steam, to the boiling point, and so maintained for about 20 minutes after all the acid has been introduced. A sample of the resultant basic calcium arsenate product is withdrawn, analyzed for total arsenic, and the necessary adjustment made by adding hydrated lime or arsenic acid to yield a product containing about 42% total $As_2O_5$. The slurry is thereafter dried and ground.

During addition of the acid, the agitators 14 and 14' are rotated in the direction of arrow 32, Fig. 2, at a speed of about 125 R. P. M. The mixing tank used may be about 7½ feet in diameter and the total batch fills the tank to a depth of about 4½ feet. The size of the agitators relative to the tank and the size of the vertical and horizontal baffles may be about in the same proportion as shown in the drawing. The horizontal baffles are preferably located at a level just beneath the level of the reaction mass after all of the ingredients have been added. When operating with the batch described in apparatus of the size and arrangement indicated, driving the agitator at the speed noted and introducing the acid in the form of relatively fine films beneath the surface of the slurry, turbulent agitation as distinguished from a swishing motion is obtained, local excess of arsenic acid over that required to react with the calcium hydroxide is substantially prevented, and rapid diffusion of the arsenic acid is effected with the result of substantially reducing formation of the water soluble acid calcium arsenates to form a product of the invention containing about 1.1% water soluble $As_2O_5$, as determined by a hereinafter described method of analysis.

It will be understood that other ways of introducing the acid into the slurry may be employed. For example, the acid may be fed in the form of one or more preferably fine streams onto the surface of the slurry while vigorously agitating the latter, the agitation being turbulent in character as distinguished from a non-turbulent more or less swirling motion. The acid may also be fed into the inlet side of a centrifugal pump while transferring the slurry from one tank to another or from the bottom of a tank to the top of the same tank. The degree of turbulent agitation depends upon factors such as the rate of addition of acid and the size of the acid stream fed into the slurry. For example, where the acid is fed slowly into the slurry in one or more relatively fine streams, the degree of agitation may be much less than in a case where the acid is fed into the slurry more or less rapidly in larger streams. Depending upon specific conditions, agitation should be such as to maintain the slurry in a relatively turbulent condition, at least in the zone of addition of the acid, sufficient to substantially avoid any local excess of arsenic acid over that required to react with the lime, to effect rapid diffusion of the arsenic acid throughout the slurry, and to provide contact of acid with sufficient calcium hydroxide to prevent formation of water soluble calcium arsenates. Considering any given operating conditions, the degree of agitation necessary to accomplish the purposes of the invention may be determined by one or more trial runs.

Products made by the present methods may be conveniently analyzed for water soluble arsenic by the following method. To 2 grams of powdered product in a flask, add 1 liter of recently boiled water cooled to 32° C. Stopper the flask and keep at 32° C. for 24 hours, shaking once every hour for the first 8 hours of this period. Filter, and determine the arsenic in the filtrate which arsenic is expressed as per cent of water soluble $As_2O_5$ in the sample. The insoluble material filtered off from the first 24 hour digestion is subjected to three successive similar 24 hour digestions, each time with a fresh lot of water, and the arsenic of each filtrate determined as before. The sum of the four determinations should not exceed about 1.50% water soluble $As_2O_5$. The example below is the full analysis of the product made as above detailed. The products of the other examples were made by other procedures substantially as described employing varying degrees of agitation.

Water soluble $As_2O_5$%

|  | 1st 24 hours | 2nd 24 hours | 3rd 24 hours | 4th 24 hours |
|---|---|---|---|---|
| Example 1 | nil | 0.17 | 0.39 | 0.54 |
| Example 2 | nil | 0.15 | 0.29 | 0.45 |
| Example 3 | nil | nil | 0.17 | 0.17 |
| Example 4 | nil | 0.44 | 0.36 | 0.36 |
| Example 5 | 0.09 | 0.23 | 0.32 | 0.35 |

To obtain comparative determination of the water soluble $As_2O_5$ by this method, any given sample should be subjected to four digestions in the carbon dioxide free water. The first extraction is relatively meaningless since free lime present in the sample acts to depress the solubility of the calcium arsenate. However, with the bulk of the free lime removed in the first extraction, subsequent extractions afford a more accurate indication of the amount of water soluble arsenic contained in a given sample and the sum of the four extractions is preferable. In general, the invention contemplates production of calcium arsenate showing not more than about 1.50% water soluble $As_2O_5$ when the results of the four digestions by the hereindescribed method are totaled.

I claim:

In the manufacture of calcium arsenate by the addition of an aqueous arsenic acid solution to an aqueous slurry of calcium hydroxide, the improvement which comprises gradually introducing the arsenic acid solution below the surface of the slurry and adjacent to the periphery of a rapidly rotating agitating rotor submerged in the calcium hydroxide slurry so as to effect substantially instantaneous diffusion of the arsenic acid solution through the slurry and regulating the addition of arsenic acid solution so that the molar ratio of arsenate to calcium in the resultant diffused mixture does not exceed such ratio in basic calcium arsenate, whereby a calcium arsenate is directly produced capable of application to foliage without causing substantial burning thereof.

ARTHUR H. HENNINGER.